United States Patent [19]

Ikuta et al.

[11] Patent Number: 4,564,168

[45] Date of Patent: Jan. 14, 1986

[54] UPPER SUPPORT FOR A RADIATOR

[75] Inventors: Yasuhiro Ikuta, Okazaki; Toshihiro Takami, Toyota, both of Japan

[73] Assignee: Toyota Jidosha Kabushiki Kaisha, Toyota, Japan

[21] Appl. No.: 629,896

[22] Filed: Jul. 11, 1984

[30] Foreign Application Priority Data

Jul. 26, 1983 [JP] Japan .................................. 58-135070

[51] Int. Cl.$^4$ ........................ F16M 1/02; B60K 11/04
[52] U.S. Cl. .................................. 248/638; 248/634; 248/232; 180/684
[58] Field of Search ............... 248/232, 632, 634, 638; 180/68.4, 68.6

[56] References Cited

U.S. PATENT DOCUMENTS

| | | | |
|---|---|---|---|
| 1,642,697 | 9/1927 | Riise | 248/632 |
| 3,121,467 | 2/1964 | Bryant | 180/68.4 |
| 3,123,170 | 3/1964 | Bryant | 248/232 X |
| 3,929,201 | 12/1975 | Hoffman | 180/68.4 |
| 4,121,682 | 10/1978 | Schaal et al. | 180/68.4 |
| 4,139,053 | 2/1979 | Schaal | 180/68.4 |
| 4,196,774 | 4/1980 | Hoffman | 248/632 X |

FOREIGN PATENT DOCUMENTS

| | | | |
|---|---|---|---|
| 0052291 | 5/1982 | European Pat. Off. | |
| 0036723 | 3/1983 | Japan | 180/68.4 |
| 967860 | 8/1964 | United Kingdom | 248/634 |

*Primary Examiner*—Ramon S. Britts
*Assistant Examiner*—Karen Chotkowski
*Attorney, Agent, or Firm*—Kenyon & Kenyon

[57] ABSTRACT

An upper support for a radiator wherein a body bracket and a radiator bracket are joined together by means of a rubber member which has at least one rubber prop on each side of the bracket axis and has a cavity disposed between the right and left rubber props. In the state before radiator assembly and also in the assembled state, the rubber props are inclined upwardly in a direction from the body bracket toward the radiator bracket. In this structure of the radiator upper support, a tensile force always works on the rubber props and accordingly there is no wide fluctuation in the dynamic spring constant. Thus the range of the cavity dimensions which effectively contribute to suppression of idle vibration and internal car noise can be so enlarged that, when there are large errors in radiator assembly, the dynamic spring constant of the vibrational system involved can remain in the effective range of the dynamic spring constants for suppression of the vibration, thereby minimizing the idle vibration and the internal car noise.

8 Claims, 7 Drawing Figures

UPPER SUPPORT FOR A RADIATOR

BACKGROUND OF THE INVENTION

1. Field of the Invention

The present invention relates to an upper support for a car radiator which elastically holds the radiator at the radiator top in cooperation with a lower support at the radiator bottom.

2. Description of the Prior Art

A car radiator is supported on a car body by means of an upper support and a lower support which have rubber members to adjust the dimensional errors in assembly and to absorb a thermal expansion difference between the radiator support assembly and the car body. Such a structure for radiator support constitutes a vibrational system which has the radiator mass, including the mass of the engine-cooling water, in the radiator and the spring constants of the rubber members in the upper and lower supports. The natural frequency of this vibrational system should be carefully set such that it will not aggravate an idle vibration of the engine or induce or aggravate the internal car noise.

FIG. 1 shows the upper support for the radiator which was proposed in Japanese Utility Model Application No. SHO 58-60810, yet to be published.

As illustrated in FIG. 1, the proposed upper support for the radiator consists of a body bracket 1 to be fitted to the car body and a radiator bracket 2 to be in pressure-contact with the radiator. The brackets 1 and 2 are joined together by a rubber member 6 which has right and left rubber props 3, 4 inclined downward from the body bracket 1 toward the radiator bracket 2 with a cavity 5 positioned between said props 3 and 4.

In the above structure of the radiator upper support, the dimensional errors in the assembled radiator as well as the thermal expansion produced therein are absorbed by the elastic deformation of rubber props 3, 4, and accordingly by the dimensional changes made in the bored cavity 5 in the upward and downward direction.

The structure of the upper support illustrated in FIG. 1 has been changed in a variety of ways to investigate the changes in its vibrational characteristics, particularly its spring constant, with a view toward providing good vibration suppressing characteristics in addition to its dimensional error-absorbing capacity. The results are summarized in FIG. 2. In FIG. 2 in which the abscissa is the initial compression in an assembled radiator, i.e., the change in the upward-downward dimension D of the cavity 5 in FIG. 1 and the ordinate is the dynamic spring constant of the upper support, the curve A represents the relation between the dynamic spring constant and the dimension D of the bored cavity of the conventional upper support in FIG. 1.

As evident from FIG. 2, the dynamic spring constant of the upper support which has its rubber props disposed in a V-shaped fashion after radiator assembly is highly sensitive to a change in the upward-downward dimension of the bored cavity due to a dimensional error in the assembled radiator, or to a change in the thermal expansion of the radiator. In FIG. 2, W indicates the range of variations in the upward-downward dimension of the bored cavity 5 due to assembly errors and/or errors created by the thermal expansion of the radiator.

In the large dimension part of the range W the force acting on the rubber props 3, 4 is mainly compression and accordingly the props exhibit a high value of the dynamic spring constant. In the small dimension part of the range W the force acting on the props 3,4 is mainly bending and accordingly the props exhibit a low value of the dynamic spring constant. Thus the dynamic spring constant fluctuates widely with variations in the upward-downward dimension of the bored cavity 5. Meanwhile, there must be a part in the range of the dynamic spring constant which would effectively contribute to suppression of an idle vibration of an engine or internal car noise. When such a part is indicated by H, the portion of the curve A which deviates from this effective range H of the dynamic spring constant, i.e., the portion $A_1$ may be called that portion which is likely to aggravate the idle vibration or the internal car noise. Thus there will be no problem when the radiator has been assembled with high precision and the dimension of the bored cavity falls within the range $W_1$, which corresponds to the effective range H of the dynamic spring constant. But when the dimension of the bored cavity falls outside of the range $W_1$ in the range W, in other words, falls within the part $A_1$ of the curve A, then the idle vibration and the internal car noise are likely to be aggravated.

SUMMARY OF THE INVENTION

In view of the fact that the above problems arise from too large a change in the dynamic spring constant as compared with the change in the upward-downward dimension of the bored cavity, the object of the present invention is to provide an upper support for a radiator wherein the change in the dynamic spring constant of the upper support is made small when compared with the dimensional change in the bored cavity so that the width of allowable dimensional changes in the bored cavity which corresponds to the effective range of the dynamic spring constants contributing to suppression of idle vibration or internal car noise can be increased.

To accomplish the above object, the radiator upper support, according to the present invention, comprises a body bracket adapted to be fitted to a car body, a radiator bracket to be pressure-contacted with a radiator top, and a rubber member which joins said two brackets together. The rubber member has at least one rubber prop on both sides of the bracket axis and has a cavity bored between the right and left props on both sides. In both a free state before radiator assembly and in the radiator assembled state, the rubber props are inclined upward from the body bracket toward the radiator bracket and desirably the props extend approximately in a tangential direction with respect to the radiator bracket.

Under the above structure of the radiator upper support, within the range of assembly error of the radiator, the rubber props are always subjected to tension and therefore the dynamic spring constant does not change widely. Thus the effective range of the bored cavity dimensions contributing to suppression of idle vibration or internal car noise can be enlarged and, as a consequence, even when there are upward-downward errors in the assembled radiator, idle vibration and internal car noise can be held low, because the dynamic spring constant of the vibrational system remains in the effective range for vibrational suppression.

BRIEF DESCRIPTION OF THE DRAWINGS

The above and other objects, features and advantages of the invention will become apparent and more readily appreciated from the following detailed description of preferred exemplary embodiments of the invention, taken in conjunction with the accompanying drawings, wherein.

DETAILED DESCRIPTION OF THE PREFERRED EMBODIMENTS

Figure 3:
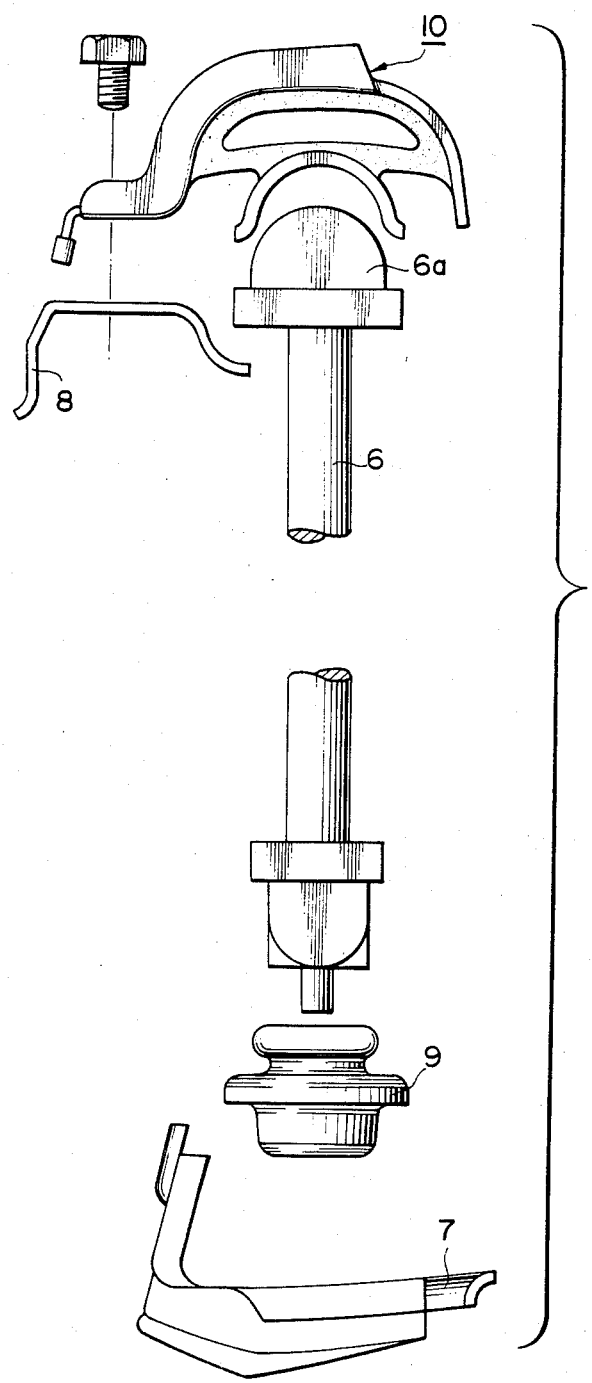
FIG. 3 is a dismantled elevational view of a radiator support assembly using a radiator upper support according to the present invention.
Figure 4:
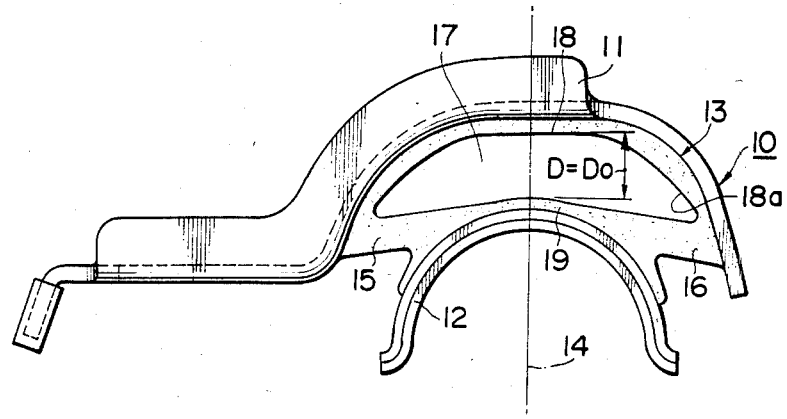
FIG. 4 is an elevational view of one embodiment of the present invention in a free state before radiator assembly.
Figure 5:
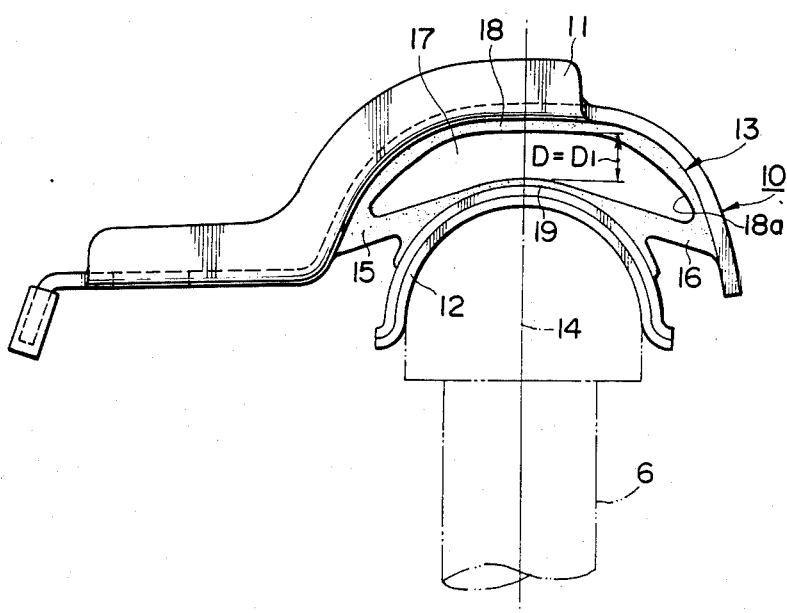
FIG. 5 is an elevational view of the upper support illustrated in FIG. 4 after radiator assembly.

Referring to the drawings, the preferred embodiments of the present invention are now to be described. FIGS. 3 to 5 illustrate an upper support in a first embodiment of the present invention, FIG. 3 showing the whole arrangement of the radiator supporting structure, FIG. 4 showing the upper support in a free state before radiator assembly and FIG. 5 showing the upper support under engine warm-up after radiator assembly.

In FIG. 3, the reference numeral 6 is a radiator which is fitted to the car body or to the members 7, 8 integrated to the car body by means of the lower support 9 and the upper support 10. The lower support 9 and the upper support 10 are provided with a rubber member which can absorb dimensional changes in the upward-downward direction. The radiator 6 is floatingly supported in the upward-downward direction by the lower support 9 and the upper support 10. In FIGS. 4 and 5, the reference numeral 11 is a body bracket fitted to the car body 8 and the reference numeral 12 is a radiator bracket, pressure-contacted with the upper tank 6a of the radiator 6. The two brackets 11 and 12 are joined together by means of a rubber member 13. The rubber member 13 has rubber props 15, 16 located on both sides of the bracket axis 14 and between the props 15 and 16 there is a bored cavity 17 which extends in a near-arc manner. Above and below the bored cavity 17 the rubber member 13 has rubber portions 18, 19 which extend along the body bracket 11 and the radiator bracket 12 respectively and are undetachably fitted thereto. The underside of the rubber portion 18 constitutes an upper wall 18a of the cavity 17 and the upper wall 18a forms a downward concave surface.

In a free state before radiator assembly, the rubber props 15, 16 are upwardly inclined in a direction from the body bracket 11 to the radiator bracket 12, that is, are inclined in an inverted V-shaped fashion. They are set such that their angle of inclination to the bracket axis 14 may be steeper in the engine warm-up stage after radiator assembly. The rubber props 15, 16 extend approximately in a tangential direction of the radiator support 12 and the inclination of the rubber props 15, 16 in a free state before radiator assembly to a horizontal line is in the range of 0 to 30 degrees.

Next, the action of the upper support in the above embodiment of the present invention is to be described.

In a free state before assembling the radiator 6, the upper support 10 is in a state illustrated in FIG. 4. In this state the rubber props 15, 16 are inclined upward with respect to the bracket axis 14 in a direction from the body bracket 11 to the radiator bracket 12 and the dimension of the bored cavity in the upward-downward direction is $D_o$.

When the radiator 6 is assembled, the radiator bracket 12 shifts upward, bringing the upper support into a position illustrated in FIG. 5. In FIG. 5 the inclination of the props 15, 16 becomes steeper than in FIG. 4 and the upward-downward dimension of the bored cavity becomes $D=D_1$, where the value of $D_1$ depends on the errors in assembling and thermal expansion of the radiator 6. The variation in the dimension $D_1$ of the bored cavity after radiator assembly is permitted to be in the range of from $D=b$ to $D_1=a$, that is, in the range of $W=a-b$.

Figure 2:
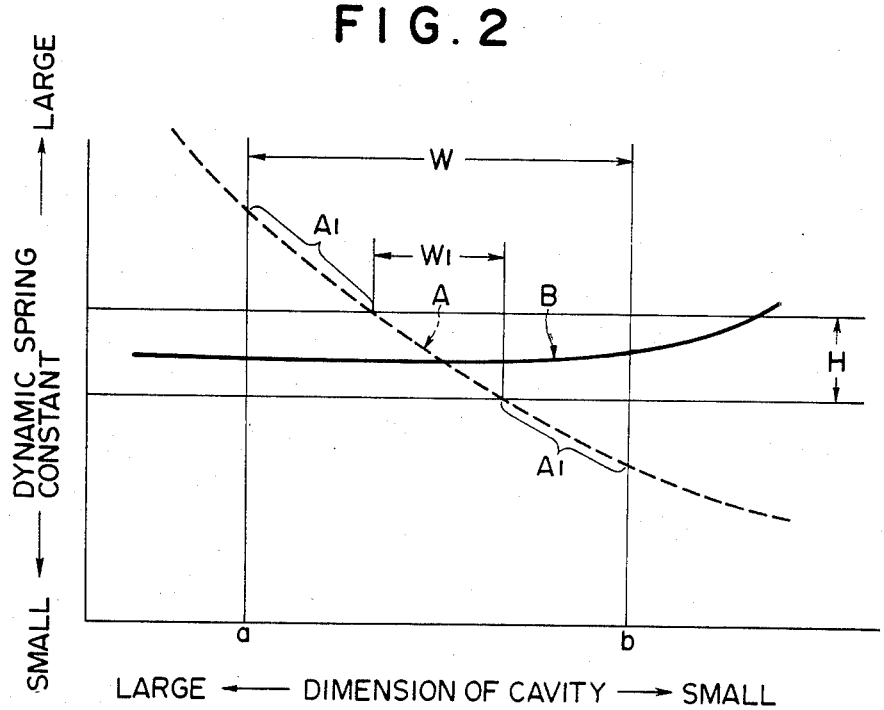
FIG. 2 is a diagram illustrating the relationship between the bored cavity dimension and the dynamic spring constant in the prop type upper support.

The relationship between the dimension D of the bored cavity 17 and the dynamic spring constant in the present invention can be plotted as shown by curve B in FIG. 2. In the transition from the state in FIG. 4 to the state in FIG. 5, the rubber props 15, 16 are subjected mainly to tension.

Since the rubber props 15, 16 extend in a tangential direction to the radiator bracket 12, the deformation of the props 15, 16 and the increase of said tension are stable. As verified by testing, the dynamic spring constant changes a little with a change in the upward-downward dimension D of the bored cavity 17. Namely, in FIG. 2 the curve B is flatter than the curve A, showing the stability of the dynamic spring characteristics. Thus the allowable range $W_1$ of the dimensions of the bored cavity corresponding to the effective range H of the spring constants for suppression of idle vibration and internal car noise is extended to the practical range W of the dimensions of the bored cavity including the assembling error and thermal expansion (which means that the value of D ranges from b to a).

In other words the whole range W of the dimensions of the bored cavity is encompassed by the effective range H of the spring constants. Thus, even when the dimensions of the bored cavity $D=D_1$ are widely altered on account of the errors in assembling and thermal expansion of the radiator 6 from a maximum value a under the assembling error in FIG. 2 to a minimum value b (where $a-b=W$), the dynamic spring constants correcsponding to this range W of the dimensions of the bored cavity will remain within the effective range H, thereby preventing aggravation of idle vibration and internal car noise.

Figure 1:
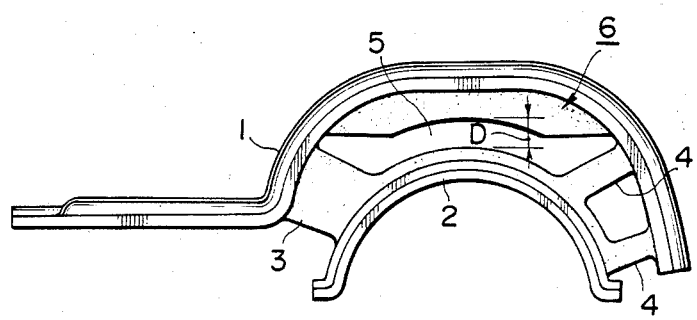
FIG. 1 is an elevational view of the radiator upper support proposed in Japanese Utility Model Application No. SHO 58-60810, yet to be published.

Since the rubber props 15, 16 extend in a tangential direction to the radiator bracket, the force acting on the props 15, 16 is generally simple tension and not any complex bending force nor any compressive force, unlike the upper support in FIG. 1. Therefore, the upper support of the present invention possesses stability in its characteristics, and excels in durability because the hardness of the rubber can be increased about 20% to obtain the same value of the dynamic spring constant and there is no heavy concentration of stresses due to bending.

Moreover, the downward concave surface of the upper wall 18a of the bored cavity 17 in the rubber member 13, which is free from any projection hindering the upward shifting of the radiator bracket 12, permits a smooth upward movement, thereby contributing to the stabilization of its characteristics.

Figure 6:
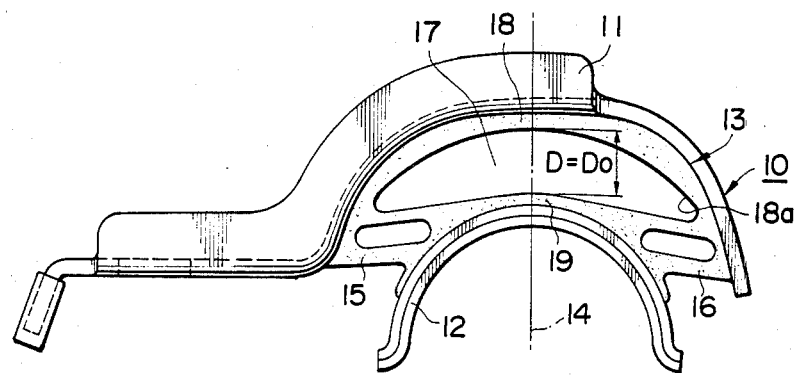
FIG. 6 is an elevational view of another embodiment of the present invention in a free state before radiator assembly.

FIG. 6 illustrates an upper support in a second embodiment of the present invention, in its free state before radiator assembly.

In this embodiment there are two rubber props 15, 16 provided on each of both sides of the bracket axis 14. In a free state before radiator assembly the rubber props 15, 16 are inclined upward from the body bracket 11 toward the radiator bracket 12 and in the stage of engine warm-up after radiator assembly, the inclination of the props, 15, 16 becomes steeper. Otherwise, the structure and action of the upper support of the second embodiment are the same as in the first embodiment of FIG. 4 and therefore like parts are noted by like symbols.

Figure 7:
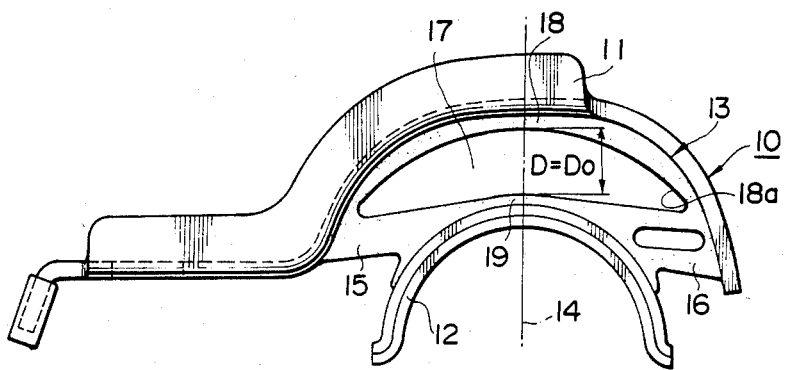
FIG. 7 is an elevational view of still another embodiment of the present invention in a free state before radiator assembly.

FIG. 7 illustrates an upper support in a third embodiment of the present invention, in its free state. In the third embodiment the rubber props 15, 16 are provided one on one side of the bracket axis 14 and two on the other side thereof. In a free state, the rubber props 15, 16 are inclined upward from the body bracket 11 toward the radiator bracket 12 and in the stage of engine warm-up after the radiator assembly, the inclination becomes steeper. Otherwise, the structure and action of the upper support of the third embodiment are the same as in the first embodiment of FIG. 4 and therefore like part thereof are noted by like symbols.

As described in the above, the radiator upper support according to the present invention, in a free state before radiator assembly, forms an inverted V-shape around the bracket axis and in the state after radiator assembly the rubber props, right and left, become more steeply inclined. Accordingly in the present invention the force acting on the rubber props is only a tensile force and therefore a change in the dynamic spring constant due to errors in assembly can be suppressed. Thus the present invention has the effect of elevating the durability of the upper support itself as well as preventing aggravation of idle vibration and internal car noise due to errors in assembly.

Although only preferred embodiments of the present invention have been described in detail, it will be appreciated by those skilled in the art that various modifications and alterations can be made to the particular embodiments shown without materially departing from the spirit and scope of the invention. Accordingly, it is to be understood that all such modifications and alterations are intended to be included within the scope of the present invention as defined by the following claims.

What is claimed is:

1. An upper support for a radiator comprising:
   a body bracket adapted to be fitted to a car body;
   a radiator bracket spaced from the body bracket and adapted to be in pressure-contact with the top of the radiator, the upper support having a bracket axis that intersects the body bracket and the radiator bracket; and
   a rubber member connecting the radiator bracket to the body bracket and having at least one rubber prop on one side of the bracket axis and at least one rubber prop on a side of the bracket axis opposite to said one side, with a bore-like cavity defined between the rubber props on the one side and the opposite side, respectively, of the bracket axis, said rubber props being inclined upwardly from the body bracket toward the radiator bracket when the support is oriented with the bracket axis vertical and the radiator bracket below the body bracket.

2. An upper support for a radiator as defined in claim 1 wherein the radiator bracket has a substantially arcuate cross section, and said rubber props extend approximately tangentially to the arcuate cross section of the radiator bracket.

3. An upper support for a radiator as defined in claim 1 wherein the inclination of said rubber props to a plane perpendicular to the bracket axis ranges from zero to 30 degrees.

4. An upper support for a radiator as defined in claim 1 wherein said rubber member comprises spaced apart rubber portions undetachably fitted to the body bracket and the radiator bracket, respectively, said rubber portions being connected by said rubber props.

5. An upper support for a radiator as defined in claim 1 wherein the rubber member comprises a rubber portion that is undetachably fitted to the body bracket and has a concave-curved surface that defines a top wall of said cavity.

6. An upper support for a radiator as defined in claim 1 wherein said rubber props consist of one prop on said one side of the bracket axis and one prop on said opposite side of the bracket axis.

7. An upper support for a radiator as defined in claim 1 wherein said rubber props consist of one prop disposed on said one side of the bracket axis and two props disposed on said opposite side thereof.

8. An upper support for a radiator as defined in claim 1 wherein said rubber props consist of two props disposed on each of said one side and said opposite side of the bracket axis.

* * * * *